United States Patent
Schuhmacher et al.

(10) Patent No.: US 7,103,077 B2
(45) Date of Patent: Sep. 5, 2006

(54) SYSTEM AND METHOD FOR MEASURING AND CONTROLLING AN ENERGY OF AN ULTRA-SHORT PULSE OF A LASER BEAM

(75) Inventors: Michael Schuhmacher, Heppenheim (DE); Markus Schiller, Frankfurt (DE)

(73) Assignee: 20/10 Perfect Vision Optische Geraete GmbH, Heidelberg (DE)

( * ) Notice: Subject to any disclaimer, the term of this patent is extended or adjusted under 35 U.S.C. 154(b) by 185 days.

(21) Appl. No.: 10/835,088

(22) Filed: Apr. 29, 2004

(65) Prior Publication Data
US 2005/0243877 A1 Nov. 3, 2005

(51) Int. Cl.
*H01S 3/10* (2006.01)

(52) U.S. Cl. .................. 372/29.01; 372/25; 372/30

(58) Field of Classification Search ..... 372/25–29.014, 372/29.1–22.011, 30; 356/213–216
See application file for complete search history.

(56) References Cited

U.S. PATENT DOCUMENTS

| | | | |
|---|---|---|---|
| 4,025,875 A | | 5/1977 | Fletcher et al. |
| 4,044,316 A | | 8/1977 | Kennedy |
| 4,391,275 A | | 7/1983 | Fankhauser et al. |
| 4,549,288 A | * | 10/1985 | Chan ...................... 369/47.35 |
| 4,733,398 A | * | 3/1988 | Shibagaki et al. ............ 372/31 |
| 5,128,601 A | | 7/1992 | Orbach et al. |
| 5,275,594 A | * | 1/1994 | Baker et al. .................. 606/12 |
| 5,291,505 A | | 3/1994 | Nielson |
| 5,303,248 A | * | 4/1994 | Gibbs .......................... 372/25 |
| 5,724,170 A | | 3/1998 | Aizawa |
| 5,726,965 A | * | 3/1998 | Hajjar et al. ............. 369/53.33 |
| 5,757,831 A | * | 5/1998 | Kmetec et al. ......... 372/29.011 |
| 5,982,790 A | * | 11/1999 | Grossman et al. ............ 372/25 |
| 6,155,684 A | | 12/2000 | Bille et al. |
| 6,323,457 B1 | * | 11/2001 | Jung ..................... 219/121.83 |
| 6,339,604 B1 | | 1/2002 | Smart |
| 2001/0021215 A1 | | 9/2001 | Bunting et el. |
| 2002/0085608 A1 | | 7/2002 | Kopt et al. |

* cited by examiner

*Primary Examiner*—James Menefee
*Assistant Examiner*—Phillip Nguyen
(74) *Attorney, Agent, or Firm*—Nydegger & Associates (57) ABSTRACT

A system for measuring the energy of an ultra-short pulse in a laser beam includes a half-wave plate for orienting the polarization of the beam. A polarizing beam splitter is used to reflect a portion of each pulse of the beam and a remainder of the beam is transmitted toward a target. Energy in the reflected portion is measured by a laser energy meter ("LEM") to determine the energy in the remainder of the beam. An output signal from the LEM is used to obtain an error signal that can then be used to rotate the half-wave plate to control the energy level in the remainder of the beam. In an alternate embodiment, a fixed-ratio beam splitter and a second LEM are used to measure and control the energy in the remainder of the laser beam.

17 Claims, 3 Drawing Sheets

SYSTEM AND METHOD FOR MEASURING AND CONTROLLING AN ENERGY OF AN ULTRA-SHORT PULSE OF A LASER BEAM

FIELD OF THE INVENTION

The present invention pertains generally to systems for measuring the energy of a laser beam. More particularly, the present invention pertains to systems for measuring the energy of an ultra-short pulse of a laser beam, wherein the laser beam comprises a plurality of ultra-short pulses. The present invention is particularly, but not exclusively, useful as a system and method for measuring a predetermined portion of the energy of an ultra-short pulse of a laser beam, for controlling the energy of the beam for laser refractive surgery.

BACKGROUND OF THE INVENTION

In many of the current applications for ultra-fast (i.e. repetition rates in the range of 1–100 kHz), ultra-short pulse lasers it is necessary or desirable to measure, and in some cases control, the energy of the laser beam that is incident on a target. For example, in laser refractive surgery the "laser-tissue" interaction within the cornea of the eye may be strongly energy dependent. It is preferable, therefore, to be able to measure the energy of the laser beam prior to the beam exiting the surgical laser system and entering the eye. Many of the current means for measuring the energy of pulsed laser beams are based on pyroelectric or thermal principles. Unfortunately, these methods are not able to accurately measure the energy of a single ultra-short laser pulse of a femtosecond laser beam, i.e. a beam with pulse durations in the range of about 1 fs to 100 ps and pulse repetition rates of several kilohertz. Thus, an alternative method is needed to measure the energy of ultra-fast, ultra-short laser pulse.

One possibility for measuring the energy of an ultra-fast, ultra-short laser pulse is to define the measurement function in terms of an equivalent electrical circuit. Using this approach, it would be possible to integrate a voltage output of the circuit over time to yield a value proportional to the input laser energy. Considering this approach in greater detail, a photodiode can be used to detect the individual pulses of a laser beam. When light corresponding to the operational wavelength of the photodiode is detected, the light is absorbed by the photodiode and charge carriers are separated within the photodiode. It is well known that the amount of separated charge carriers, which is actually the charge, is directly proportional to the energy of the incident laser pulse. If both ends of the photodiode are electrically connected, the separated charge carriers will equalize and generate a current. Notably, the integral of this current over time is proportional to the amount of the separated charge carriers. It follows, therefore, that the integral of a voltage generated by the current is also proportional to the amount of separated charge carriers. Importantly, the value of this integral is the output value, and it is proportional to the energy of the incident laser pulse. With regard to the integration of the voltage discussed above, a fast analog integrator is used to calculate the integral. The integration process can be started either before, during, or very shortly after the laser pulse reaches the photodiode.

There are several advantages to using a photodiode circuit to define and quantify the pulse energy in terms of the integral of the voltage. It should be noted, however, that many photodiodes comprise "peak" value detectors. Unfortunately, this type of detector is not capable of measuring ultra-short pulses at very high repetition rates. Nonetheless, it should be possible with certain photodiodes well known in the pertinent art to measure the energy of a single ultra-short pulse. In this context the measurement is actually the integration of the impulse response of the photodiode. An advantage of integrating the impulse response is that the measurement is not dependent on the pulse duration or number of pulses. A further advantage is that fluctuations of the photodiode's capacity do not affect the ultimate measurement. Also, pulse to pulse energy measurements at high repetition rates can be achieved.

In addition to quantifying the energy of a laser pulse, the measured energy data can be used as feedback into a control loop for controlling the energy of the laser beam as well. With regard to medical applications, such as laser refractive surgery, both system efficiency and patient safety drive the need for such positive control.

In light of the above, it is an object of the present invention to provide a system and method for measuring the energy of a laser beam. Another object of the present invention is to provide a system and method for measuring the energy of a single ultra-fast, ultra-short pulse of a laser beam, wherein the laser beam comprises a plurality of pulses at very high repetition rates, in the range of 1–100 kHz. Yet another object of the present invention is to provide a system and method for measuring the energy of an ultra-fast, ultra-short pulse of a laser beam for controlling the laser energy incident on a target. Still another object of the present invention is to provide a system and method for measuring the energy of an ultra-fast, ultra-short pulse of a laser beam that is easy to use, relatively simple to manufacture, and comparatively cost effective.

SUMMARY OF THE INVENTION

A system for measuring and controlling an energy in an ultra-short pulse of a laser beam, wherein the laser beam comprises a plurality of pulses, includes a laser source for directing the laser beam along a beam path. Preferably the laser beam is a femtosecond laser beam having pulses with durations on the order of 1 femtosecond to 100 picoseconds. Additionally, the system of the present invention includes a subassembly for selectively reflecting a portion of the energy of the laser beam, while transmitting a remainder of the laser beam along the beam path. More specifically, the subassembly includes a rotating half-wave plate and a polarizing beam splitter. The rotating half-wave plate is positioned on the beam path for establishing an orientation of the linear polarization of the laser beam. Further, the polarizing beam splitter is optically aligned with the half-wave plate for reflecting a predetermined portion of the energy, and for transmitting the remainder of the laser beam along the beam path.

As contemplated by the present invention, a laser energy meter ("LEM") is positioned to receive the predetermined portion of the laser beam that is reflected by the polarizing beam splitter. Structurally, the LEM includes a photodiode for receiving the energy of each ultra-short pulse, and for absorbing the energy to generate a current. Preferably, an optical filter is integrated into the LEM for controlling the energy incident on the photodiode. Further, the LEM includes a resistor for applying the current to generate a voltage pulse, and an amplifier for amplifying the voltage pulse. Additionally, an integrator is in electronic communication with the amplifier for receiving and integrating the amplified voltage pulse over a specified time period, to obtain an output signal. In addition to the LEM, the system of the present invention includes a comparator for comparing the output signal of the LEM to a known reference signal, to generate an error signal. Also, the comparator is in electronic communication with the half-wave plate for transmitting the error signal to the half-wave plate. The error signal is then used to rotate the half-wave plate, and thereby achieve the desired laser energy level when the error signal is a nullity.

In addition to the subassembly and LEM disclosed above, the system may also include a fixed-ratio beam splitter positioned on the beam path downstream from the polarizing beam splitter. More particularly, the fixed-ratio beam splitter is positioned for extracting a fixed portion of energy from each ultra-short pulse in the remainder of the laser beam. Further, a "verification" LEM may be optically aligned with the fixed-ratio beam splitter for measuring the fixed portion of the energy extracted by the fixed-ratio beam splitter. For the purposes of the present invention, the verification LEM is structurally the same as the LEM disclosed above. Also, the comparator is in electronic communication with the verification LEM for receiving and processing a remainder output signal generated by the verification LEM.

In the operation of the present invention, the laser source generates a linearly polarized laser beam having an E-field vector that defines the orientation of the polarization of the beam. Initially, the half-wave plate is rotated about its axis of rotation to position a principal axis of the plate at an angle "θ" relative to the E-field vector. As the laser beam transits the half-wave plate, a new orientation of the polarization of the laser beam is established. Specifically, as the laser beam transits the half-wave plate, the E-field vector is rotated through an angle of "2θ". After transiting the half-wave plate, the laser beam is directed toward the polarizing beam splitter. In the polarizing beam splitter, the beam is divided into two orthogonal polarizations. More specifically, the polarizing beam splitter reflects a first polarization, which is to say the beam splitter reflects a predetermined portion of the energy of each ultra-short laser pulse. Additionally, the second polarization, which is the remainder of the laser beam, is transmitted along the beam path.

As envisioned by the present invention, the predetermined portion of the energy of each pulse, reflected by the polarizing beam splitter, is absorbed by the photodiode in the LEM. In the LEM, the photodiode generates a current at the resistor, which leads to a voltage pulse at the input to the amplifier. The voltage pulse is amplified in the amplifier and subsequently transmitted to the integrator, wherein the voltage pulse is integrated over a specified time period. Consequently, an output signal is generated by the integrator. As can be appreciated, the output signal is a measure of the amount of charge produced in the photodiode. The amount of charge, in turn, is a measure of the energy reflected by the polarizing beam splitter and absorbed by the photodiode.

At the completion of the integration process, the output signal is transmitted electronically to the comparator. In one embodiment of the present invention, the output signal is compared with a known reference signal representative of the laser energy required at the target. From this comparison of the output and reference signals, an error signal is generated. This error signal is then transmitted to the half-wave plate, and used to rotate the half-wave plate. Rotation of the plate establishes a new orientation of the polarization of the laser beam. As can be appreciated by the skilled artisan, establishing a new orientation for the polarization of the laser beam changes the amount of energy that is reflected by the polarizing beam splitter. Importantly, this change in the amount of reflected energy is proportional to a change in the energy of the remainder of the laser beam that is transmitted along the beam path.

With regard to the remainder of the laser beam, the fixed-ratio beam splitter is positioned on the beam path to receive the remainder of the laser beam. As the remainder of the laser beam passes through the fixed-ratio beam splitter, a fixed portion of the energy from each ultra-short pulse of the laser beam is extracted. Concurrently, the remaining portion of the beam is transmitted toward the target. Preferably, the percentage of energy extracted is in the range of one to five percent (1–5%) of the total energy of the remainder of the beam. Further, the extracted portion of the laser beam is reflected towards the verification LEM. At the verification LEM, the energy is absorbed and a remainder output signal is generated. It is to be understood that the remainder output signal is a measure of the current produced in the photodiode of the verification LEM. The current produced is, in turn, a measure of the energy extracted from each pulse of the remainder of the laser beam.

Once the integration process in the verification LEM is complete, the comparator receives the remainder output signal and compares the remainder output signal with a known reference signal. A verification signal is then generated. In the preferred embodiment of the present invention, the verification signal is transmitted directly to the half-wave plate in lieu of the error signal. At the half-wave plate, the verification signal is used to rotate the plate as necessary to establish a new orientation of the polarization of the beam. In an alternate embodiment, the verification signal is compared with the error signal disclosed above. Any variances between the verification signal and the error signal are resolved by the comparator, and a new verification signal is transmitted to the half-wave plate. As necessary, the half-wave plate is rotated to establish a new orientation of the polarization of the laser beam. As discussed above, a change in the orientation of the polarization of the laser beam results in a change in the energy transmitted toward the target in the remainder of the laser beam.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
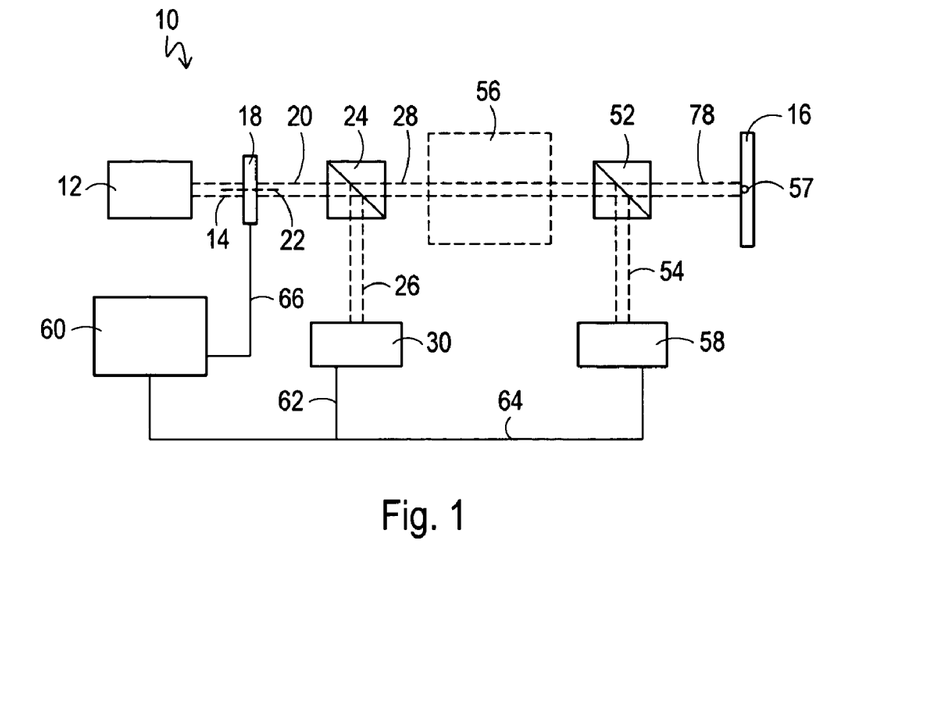
FIG. 1 is a schematic of a system for measuring and controlling the energy of an ultra-short pulse of a laser beam, in accordance with the present invention.

A system for measuring and controlling the energy of an ultra-short pulse in a laser beam, in accordance with the present invention, is shown in FIG. 1 and is generally designated 10. As shown, the system 10 includes a laser source 12 for directing a laser beam 14 to a target 16. Preferably, the laser source 12 is a femtosecond laser source 12. More specifically, the pulse duration of a single pulse of the laser beam 14 is in the range of about 1 femtosecond to 100 picoseconds. As can be appreciated, the laser beam 14 comprises a plurality of ultra-short pulses, wherein each ultra-short pulse has an energy. Also, the laser beam 14 is a linearly polarized beam 14. In addition to the laser source 12, the system 10 of the present invention includes a rotating half-wave plate 18. Specifically, the half-wave plate 18 is of a type well known in the pertinent art for establishing an orientation of the polarization of the laser beam 14. As shown, the half-wave plate 18 is positioned on the beam path 20 with an axis of rotation 22 that is oriented parallel to the beam path 20. Still referring to FIG. 1, a polarizing beam splitter 24 is positioned sequentially on the beam path 20 after the half-wave plate 18. More particularly, the polarizing beam splitter 24 is optically aligned with the half-wave plate 18 for reflecting a predetermined portion 26 of the energy of each ultra-short pulse of the laser beam 14. Additionally, the beam splitter 24 transmits a remainder 28 of the laser beam 14 along the beam path 20 toward the target 16. As further shown in FIG. 1, a laser energy meter ("LEM") 30 is optically aligned with the polarizing beam splitter 24 for receiving and measuring the predetermined portion 26 of the energy of each pulse.

Figure 2:
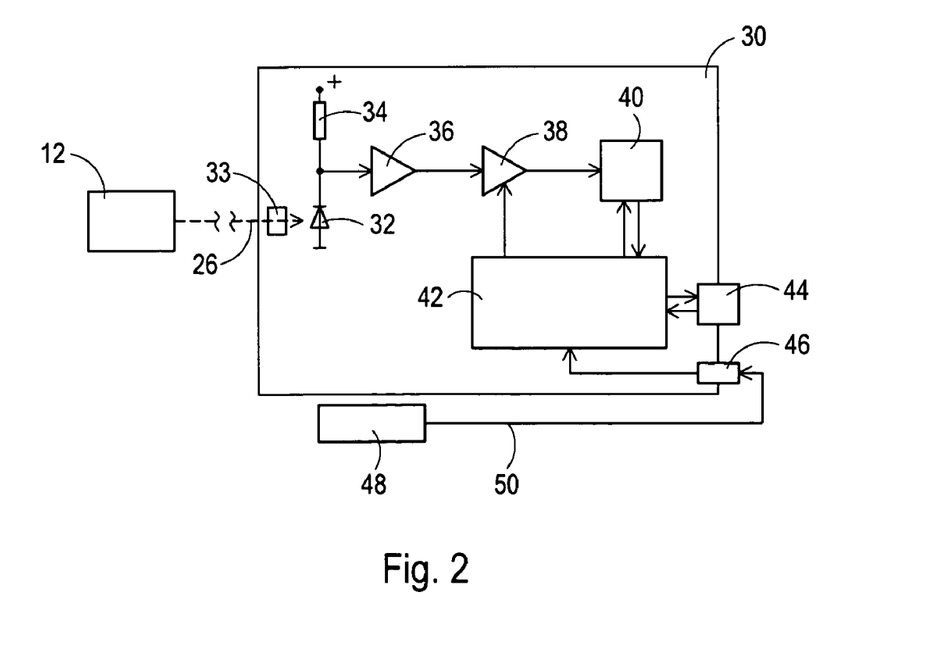
FIG. 2 is a schematic of a laser energy meter for measuring a predetermined portion of the energy of an ultra-short pulse of a laser beam.

Referring for a moment to FIG. 2, the LEM 30 of the present invention is shown in greater detail. As shown, the LEM 30 includes a photodiode 32 for receiving the predetermined portion 26 of the energy, and for generating a current. Preferably, the LEM 30 also includes an optical filter 33 for controlling the energy incident on the photodiode 32. As a result of being able to control the incident energy, the system 10 of the present invention can include any number of laser sources 12 which generate laser beams 14 having different energies. Further, a resistor 34 is positioned to receive the current and thereby produce a voltage pulse. Additionally, an amplifier 36 is positioned to receive and amplify the voltage pulse. As shown in FIG. 2, an integrator 38 is in electronic communication with the amplifier 36 for integrating the amplified voltage pulse over a specified time period, to obtain an analog output signal. Preferably, the LEM 30 includes an A/D converter 40 for converting the analog output signal to a digital signal. The LEM 30 also includes a complex programmable logic device ("CPLD") 42 for controlling the timing of the LEM 30. As further shown in FIG. 2, the CPLD 42 is in electronic communication with both the integrator 38 and the A/D converter 40. Also, the LEM 30 includes a connector port 44 and a connector port 46, wherein the connector port 44 is a digital COM-interface port. As contemplated by the present invention, a laser timing generator 48, for controlling the activation of the primary LEM 30 and starting the integration process, is connected to the connector port 46 via an electrical wire 50.

Referring back to FIG. 1, a fixed-ratio beam splitter 52 is positioned on the beam path 20. More specifically, the fixed-ratio beam splitter 52 is positioned sequentially on the beam path 20 after the polarizing beam splitter 24. Of note, an optical assembly 56 (shown in phantom), which houses the optics required to focus the laser beam 14 to a focal point, is positioned between the polarizing beam splitter 24 and the fixed-ratio beam splitter 52. Further, a verification LEM 58 is optically aligned with the fixed-ratio beam splitter 52 for receiving and measuring the fixed portion 54 of energy extracted by the fixed-ratio beam splitter 52. As envisioned by the present invention, the verification LEM 58 is structurally and functionally the same as the LEM 30. Also, a comparator 60 is in electronic communication with the LEM 30 and with the LEM 58, via electrical cables 62 and 64 respectively. Additionally, the comparator 60 is in electronic communication with the half-wave plate 18 via electrical cable 66.

Figure 3:
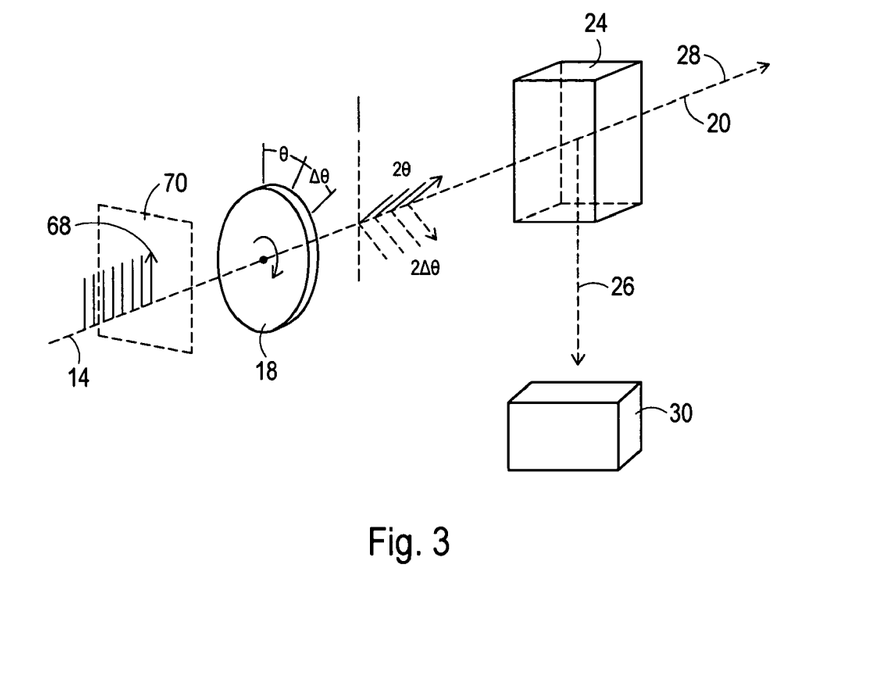
FIG. 3 is a perspective view of a subassembly of the present invention, which includes a half-wave plate for establishing an orientation of the polarization of the laser beam, and a polarizing beam splitter for reflecting a portion of the beam toward a laser energy meter while transmitting a remainder of the beam along the beam path.

In the operation of the present invention, the laser source 12 generates a laser beam 14 which is transmitted along the beam path 20 toward the half-wave plate 18. As shown in FIG. 3, the laser beam 14 is represented as a linearly polarized beam 14. More specifically, the laser beam 14 has an E vector 68 that lies in a plane 70 which is perpendicular to the beam path 20. In this context, it is to be understood that the E vector 68 defines the orientation of the polarization of the beam 14. Still referring to FIG. 3, it can be seen that as the half-wave plate 18 is rotated, the orientation of the polarization of the beam 14 is also changed. More particularly, when the half-wave plate 18 is rotated about the axis of rotation 22 through an angle "θ", the E vector 68 subsequently rotates through an angle of "2θ". Stated differently, as the laser beam 14 transits the half-wave plate 18, the orientation of the polarization of the beam 14 is changed by "2θ" degrees.

After transiting the half-wave plate 18, the laser beam 14 enters the polarizing beam splitter 24. As further shown in FIG. 3, the polarizing beam splitter 24 reflects a predetermined portion 26 of the energy of the beam 14 toward the LEM 30. Further, a predetermined remainder 28 of the beam 14 is transmitted along the beam path 20. Importantly, the ratio of reflected energy to transmitted energy is a known ratio which is dependent upon the orientation of the polarization of the beam 14. As disclosed above, the half-wave plate 18 is used to establish the orientation of the polarization of the laser beam 14. It can be appreciated by the skilled artisan, therefore, that the half-wave plate 18 is used to control the amount of energy transmitted toward the target 16 in the remainder 28 of the laser beam 14.

Figure 4:
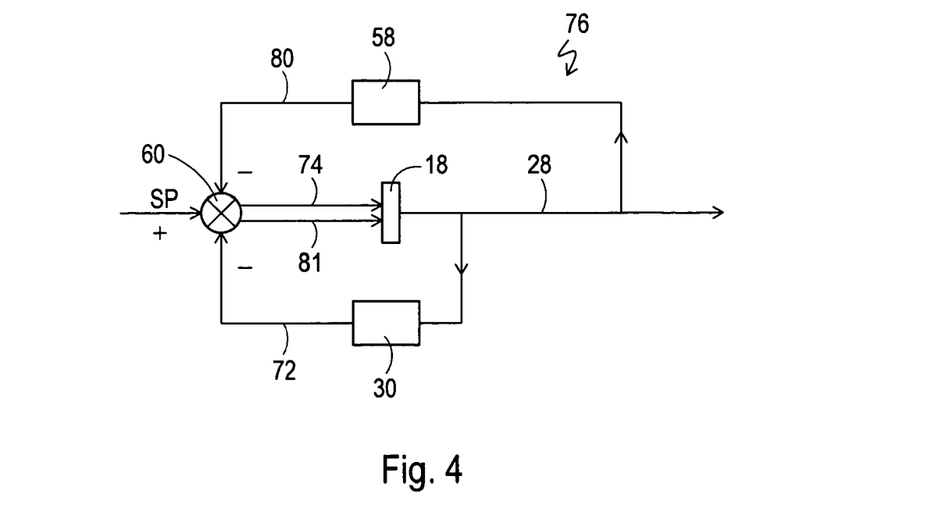
FIG. 4 is a schematic of a control loop for controlling the energy of a laser beam.

Cross-referencing for a moment FIG. 2 with FIG. 3, it can be seen that the predetermined portion 26 of the energy reflected by polarizing beam splitter 24 is directed toward the LEM 30. As the predetermined portion 26 of the energy approaches the LEM 30, the laser timing generator 48 activates the LEM 30. Specifically, the laser timing generator 48 transmits a command signal to the CPLD 42, via the connector port 46, to initiate the operation of the LEM 30. Once the LEM 30 is activated, the photodiode 32 absorbs the predetermined portion 26 of the energy of each ultra-short pulse transmitted through the optical filter 33. Absorption of the pulse energy produces separated charge carriers in the photodiode 32, which leads to a current at the resistor 34. The current, in turn, is used to generate a voltage pulse that is transmitted to the amplifier 36. In the amplifier 36, the voltage pulse is amplified and subsequently transmitted to the integrator 38. As envisioned by the present invention, the integrator 38 integrates the voltage pulse over a specified time period to obtain an output signal 72 (FIG. 4). It can be appreciated that the output signal 72 is proportional to the amount of charge produced in the photodiode 32. The amount of charge is, in turn, a measure of the predetermined portion 26 of the energy from each ultra-short pulse reflected by the polarizing beam splitter 24. It follows, therefore, that by knowing the ratio of energy reflected to energy transmitted by the polarizing beam splitter 24, it is possible to quantify the amount of energy in the remainder 28 of the beam 14.

Still referring to FIG. 2, the output signal 72 (FIG. 4) of the integrator 38 is transmitted through the A/D converter 40, wherein the output signal 72 is converted from an analog signal to a digital signal. Further, the digital signal is transmitted through the CPLD 42 and the connector port 44 to the comparator 60. After receiving the output signal 72, the comparator 60 compares the output signal 72 with a known reference signal to obtain an error signal 74 (FIG. 4).

Importantly, in one embodiment of the present invention, the error signal 74 can be used in the control of the energy of the laser beam 14. Referring now to FIG. 4, a schematic of a control loop 76 of the present invention is presented. As shown, the comparator 60 receives input data in the form of a set point (SP), which is a known reference signal. Also, the comparator 60 receives the output signal 72 from the LEM 30. From these inputs, the comparator 60 calculates an error signal 74 which is transmitted to the rotating half-wave plate 18. As can be appreciated by referring to FIG. 3, the error signal 74 is used to rotate the half-wave plate 18 through an angle of "Δθ". As discussed above, rotation of the half-wave plate 18, relative to the orientation of the E vector 68, establishes a new orientation of the polarization of the laser beam 14. Specifically, by rotating the half-wave plate 18 through a subsequent angle of "Δθ", the E vector 68 is rotated through a subsequent angle of "2Δθ", as shown in FIG. 3. A change in the orientation of the E vector 68 results in a new remainder 28 of the laser beam 14 being transmitted toward the target 16. Importantly, control of the energy of the laser beam 14 may be an iterative process whereby an updated signal 72 from the LEM 30 is periodically transmitted to the comparator 60 for use in calculating a new error signal 74.

Figure 5:
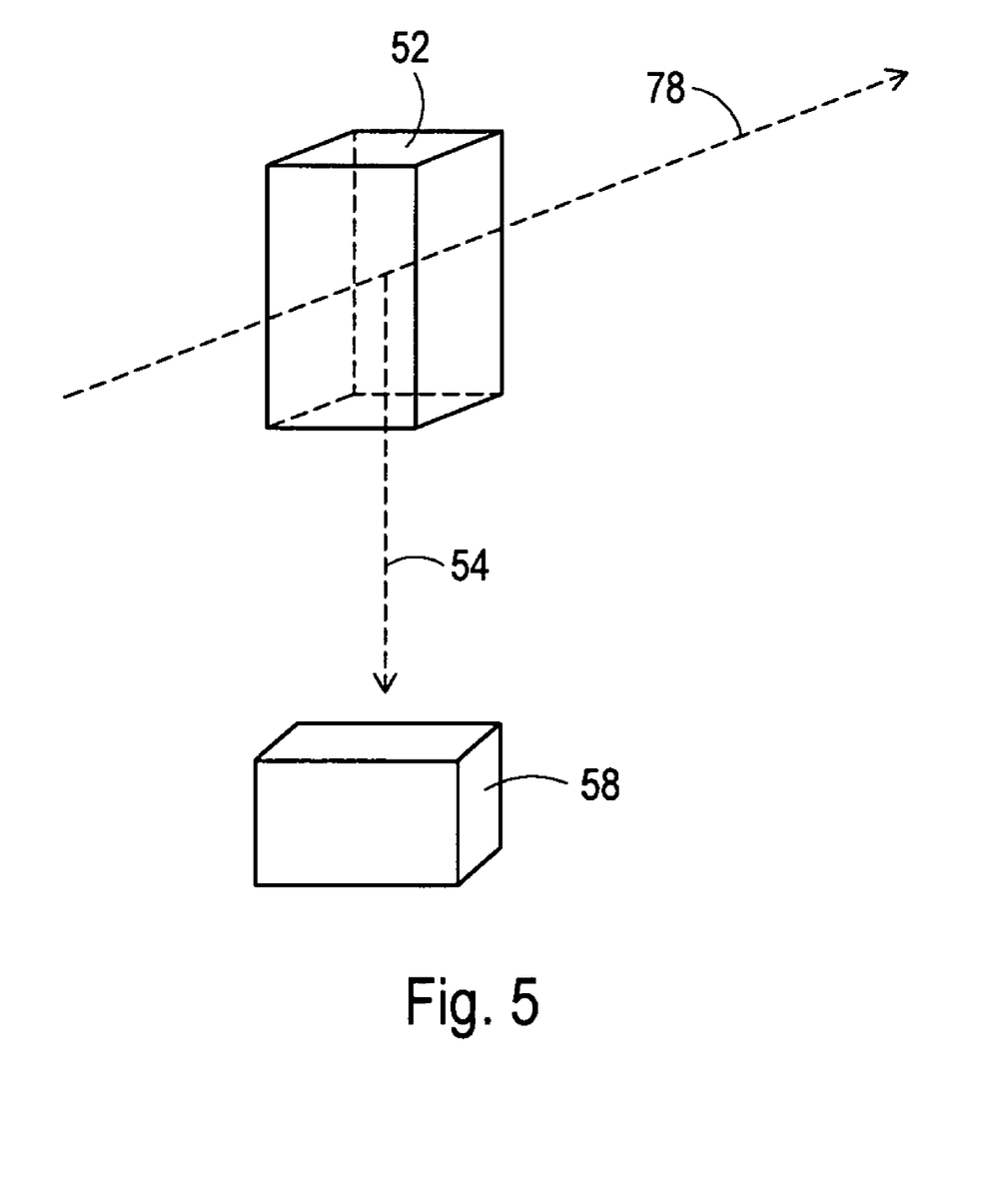
FIG. 5 is a perspective view of a fixed-ratio beam splitter for dividing a remainder of the laser beam into two components, and reflecting one component toward a laser energy meter while transmitting the second component toward the target.

Referring once again to FIG. 1, the remainder 28 of the laser beam 14 is transmitted along the beam path 20. More specifically, the remainder 28 passes through the optical assembly 56, wherein the remainder 28 of the laser beam 14 is focused to a focal point 57 on the target 16. After transiting the optical assembly 56, the remainder 28 of the laser beam 14 enters the fixed-ratio beam splitter 52. Cross-referencing now to FIG. 1 and FIG. 5, it can be seen that a fixed portion 54 of the energy of each ultra-short pulse of the remainder 28 is extracted by the fixed-ratio beam splitter 52. The remaining energy 78 is transmitted toward the target 16. Preferably, the fixed portion 54 of the energy represents a range of one to five percent (1–5%) of the total energy of the remainder 28 of the laser beam 14. As shown in both FIG. 1 and FIG. 5, the fixed portion 54 of the energy enters the verification LEM 58, wherein a remainder output signal 80 (FIG. 4) is generated. Following the operation of the verification LEM 58, the remainder output signal 80 is transmitted to the comparator 60 via electrical line 64.

In the comparator 60, the remainder output signal 80 is compared to the known reference signal to generate a verification signal 81. In the preferred embodiment of the present invention, the verification signal 81 is transmitted directly to the half-wave plate 18, in lieu of the error signal 74, to rotate the plate 18 and establish a new orientation of the polarization of the laser beam 14. In an alternate embodiment, the verification signal 81 is compared to the error signal 74 of the LEM 30. Any variations between the error signal 74 and the verification signal 81 are resolved by the comparator 60, and the verification signal 81 is recalculated as necessary. Subsequently, the verification signal 81 is transmitted to the half-wave plate 18, to rotate the plate 18 and establish a new orientation of the polarization of the laser beam 14. As disclosed above, a new orientation of the polarization results in a new remainder 28 of the laser beam 14, which is representative of the energy of that portion of the beam 14 striking the target 16.

While the particular System and Method for Measuring and Controlling an Energy of an Ultra-Short Pulse of a Laser Beam as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An apparatus for measuring energy in an ultra-short pulse of a laser beam which comprises:
   a laser source for directing a laser beam along a beam path, wherein the laser beam includes a plurality of the ultra-short pulses, and each pulse has an energy;
   a photodiode for receiving a predetermined portion of the energy of each ultra-short pulse of the laser beam to generate a current therewith, wherein the current produces a voltage pulse indicative of the energy in a single laser pulse;
   an amplifier for amplifying the voltage pulse;
   an integrator for integrating the amplified voltage pulse over a specified time period to obtain an output signal, wherein the output signal is a measure of the energy of an ultra-short pulse from the laser beam;
   a rotating half-wave plate positioned on the beam path for establishing an orientation of the polarization of the laser beam;
   a polarizing beam splitter, optically aligned with said half-wave plate, for reflecting the predetermined portion of the energy of each ultra-short pulse toward said photodiode and for transmitting a remainder of the laser beam along the beam path; and
   a comparator for controlling the rotation of said half-wave plate.

2. An apparatus as recited in claim 1 wherein said comparator compares the output signal of said integrator with a known reference signal to generate an error signal, and further wherein the error signal is used for rotating said half-wave plate to establish the orientation of the polarization of the laser beam for controlling the energy transmitted in the remainder of the laser beam.

3. An apparatus as recited in claim 1 which further comprises:
   a fixed-ratio beam splitter positioned on the beam path for extracting a fixed portion of the energy from each ultra-short pulse in the remainder of the laser beam; and
   a verification laser energy meter positioned to receive and measure the fixed portion of the energy.

4. A apparatus as recited in claim 3 wherein said verification laser energy meter comprises:
   a photodiode for receiving the fixed portion of the energy of each ultra-short pulse of the remainder of the laser beam to generate a remainder current therewith, wherein the remainder current produces a remainder voltage pulse indicative of the energy in a single laser pulse in the remainder of the laser beam;
   an amplifier for amplifying the remainder voltage pulse; and an integrator for integrating the amplified remainder voltage pulse over a specified time period to obtain a remainder output signal, wherein the remainder output signal is a measure of the energy of an ultra-short pulse from the remainder of the laser beam.

5. An apparatus as recited in claim 4 wherein said comparator compares the remainder output signal of said verification laser energy meter to a known reference signal for generating a verification signal, and further wherein the verification signal is used to rotate said half-wave plate and establish the orientation of the polarization of the laser beam for controlling the energy transmitted in the remainder of the laser beam.

6. An apparatus as recited in claim 4 wherein said comparator compares the output signal with a known reference signal to generate an error signal, and wherein said comparator compares the remainder output signal to the known reference signal to generate a verification signal, and further wherein the verification signal is compared to the error signal to compensate the verification signal as needed to rotate said half-wave plate and establish the orientation of the polarization of the laser beam.

7. A system for measuring energy in an ultra-short pulse of a laser beam which comprises:
   a means for directing the laser beam along a beam path, wherein said laser beam includes a plurality of the ultra-short pulses, and each pulse has an energy;
   a means for converting a predetermined portion of the energy of each ultra-short pulse of the laser beam into an electrical current, wherein the current produces a voltage pulse indicative of the energy in a single laser pulse;
   a means for amplifying said voltage pulse;
   a means for integrating the amplified voltage pulse over a specified time period to obtain an output signal, wherein the output signal is a measure of the energy in an ultra-short pulse of the laser beam;
   a means for establishing an orientation of the polarization of the laser beam;
   a means for reflecting the predetermined portion of the energy of each ultra-short pulse of the laser beam toward said converting means, and for transmitting a remainder of the laser beam along the beam path; and
   a comparator for controlling said establishing means.

8. A system as recited in claim 7 wherein said comparator compares the output signal of said integrating means with a known reference signal to generate an error signal, and further wherein the error signal is used by said establishing means to establish the orientation of the polarization of the laser beam for controlling the energy transmitted in the remainder of the laser beam.

9. A system as recited in claim 7 wherein said establishing means is a rotating half-wave plate positioned on the beam path, and further wherein said reflecting means is a polarizing beam splitter optically aligned with said rotating half-wave plate.

10. A system as recited in claim 9 which further comprises:
   a means for extracting a fixed portion of the energy from each ultra-short pulse in the remainder of the laser beam; and
   a means for measuring the fixed portion of the energy.

11. A system as recited in claim 10 wherein said extracting means is a fixed-ratio beam splitter.

12. A system as recited in claim 11 wherein said measuring means is a verification laser energy meter, and further wherein said verification laser energy meter comprises:

a photodiode for receiving the fixed portion of the energy of each ultra-short pulse of the remainder of the laser beam to generate a remainder current therewith, wherein the remainder current produces a remainder voltage pulse indicative of the energy in a single laser pulse in the remainder of the laser beam an amplifier for amplifying the remainder voltage pulse; and
an integrator for integrating the amplified remainder voltage pulse over a specified time period to obtain a remainder output signal, wherein the remainder output signal is a measure of the energy in an ultra-short pulse from the remainder of the laser beam.

13. A system as recited in claim 12 wherein said comparator compares the remainder output signal of said verification laser energy meter to a known reference signal for generating a verification signal, and further wherein the verification signal is used to rotate said half-wave plate to establish the orientation of the polarization of the laser beam, for controlling the energy transmitted in the remainder of the laser beam.

14. A system as recited in claim 12 wherein said comparator compares the output signal with a known reference signal to generate an error signal, and wherein said comparator compares the remainder output signal to the known reference signal to generate a verification signal, and further wherein the verification signal is compared to the error signal to compensate the verification signal as needed to rotate said half-wave plate and establish the orientation of the polarization of the laser beam.

15. A method for measuring energy in an ultra-short pulse of a laser beam which comprises the steps of:
   directing a laser beam along a beam path, wherein the laser beam includes a plurality of the ultra-short pulses, and each pulse has an energy;
   converting a predetermined portion of the energy of each ultra-short pulse of the laser beam into an electrical current, wherein the current produces a voltage pulse indicative of the energy in a single laser pulse;
   amplifying said voltage pulse;
   integrating the amplified voltage pulse over a specified time period to obtain an output signal, wherein the output signal is a measure of the energy of an ultra-short pulse from the laser beam;
   passing the laser beam through a rotating half-wave slate positioned on the beam path, wherein said rotating half-wave plate establishes an orientation of the polarization of the laser beam; and
   dividing the laser beam with a polarizing beam splitter which is optically aligned with said half-wave plate to reflect the predetermined portion of the energy of each ultra-short purse toward said photodiode, and to transmit a remainder of the laser beam along the beam path.

16. A method as recited in claim 15 which further comprises the step of comparing the output signal with a known reference signal to generate an error signal, wherein said error signal is used for rotating said half-wave plate to establish the orientation of the polarization of the laser beam for controlling the energy transmitted in the remainder of the laser beam.

17. A method as recited in claim 15 which further comprises the steps of:
   dividing the remainder of the laser beam with a fixed-ratio beam splitter, wherein said fixed-ratio beam splitter extracts a fixed portion of the energy from each ultra-short pulse in the remainder of the laser beam;

activating a verification laser energy meter positioned to receive the fixed portion of the energy of each ultrashort pulse, for generating a remainder output signal;

comparing the remainder output signal of said verification laser energy meter to a known reference signal for generating a verification signal; and applying the verification signal to rotate said half-wave plate to establish the orientation of the polarization of the laser beam for controlling the energy transmitted in the remainder of the laser beam.

* * * * *

UNITED STATES PATENT AND TRADEMARK OFFICE
CERTIFICATE OF CORRECTION

PATENT NO. : 7,103,077 B2  Page 1 of 1
APPLICATION NO. : 10/835088
DATED : September 5, 2006
INVENTOR(S) : Michael Schuhmacher and Markus Schiller It is certified that error appears in the above-identified patent and that said Letters Patent is hereby corrected as shown below:

Column 10, Line 6
DELETE
" beam "
INSERT
-- beam; --

Column 10, Line 6
Create new paragraph beginning with the words: an amplifier for amplifying the remainder voltage pulse;

Column 10, Line 46
DELETE
" slate "
INSERT
-- plate --

Signed and Sealed this

Twenty-sixth Day of December, 2006

JON W. DUDAS
*Director of the United States Patent and Trademark Office*